United States Patent

[11] 3,576,105

| [72] | Inventors | Joseph L. Peczkowski;<br>Mike Snider; Francis G. Sollman, South Bend, Ind. |
|---|---|---|
| [21] | Appl. No. | 859,785 |
| [22] | Filed | Sept. 22, 1969 |
| [45] | Patented | Apr. 27, 1971 |
| [73] | Assignee | The Bendix Corporation |

[54] ENGINE GOVERNOR HAVING LAGGED RATE FEEDBACK
10 Claims, 3 Drawing Figs.

[52] U.S. Cl. ................................................. 60/39.28, 91/366
[51] Int. Cl. ...................................................... F02c 9/08
[50] Field of Search ........................................... 60/39.28; 91/366

[56] References Cited
UNITED STATES PATENTS

| 2,669,973 | 2/1954 | Parker | 91/366X |
| 3,139,894 | 7/1964 | Strebinger | 60/39.28 |
| 3,142,154 | 7/1964 | Leeson | 60/39.28 |
| 3,187,505 | 6/1965 | Plummer | 60/39.28 |
| 3,393,607 | 7/1968 | Peczowski | 91/366X |
| 3,393,691 | 7/1968 | Longstreet | 60/39.28X |

Primary Examiner—Clarence R. Gordon
Attorneys—Gordon H. Chenez and Plante, Arens, Hartz, Hix and Smith ABSTRACT: A combustion engine governor including a fluid servo operated differential area piston having one face vented to a controlled pressurized servo fluid and a second face of relatively smaller area vented to a regulated pressure fluid source via a fluid restriction. A servo valve responsive to a speed error input signal controls the pressure of the servo fluid and is further responsive to a fluid pressure differential generated across the fluid restriction which varies as a function of the rate of displacement of the piston. Variable volume chambers separated by a resiliently loaded fluid pressure responsive movable wall have fluid connections to opposite sides of the fluid restriction and the movable wall responds to pressure actuations thereacross to effect a predetermined lag in the pressure differential generated across the fluid restriction.

PATENTED APR 27 1971

INVENTORS
JOSEPH L. PECZKOWSKI,
MIKE SNIDER
BY  & FRANCIS G. SOLLMAN

Gordon H. Chevez
AGENT

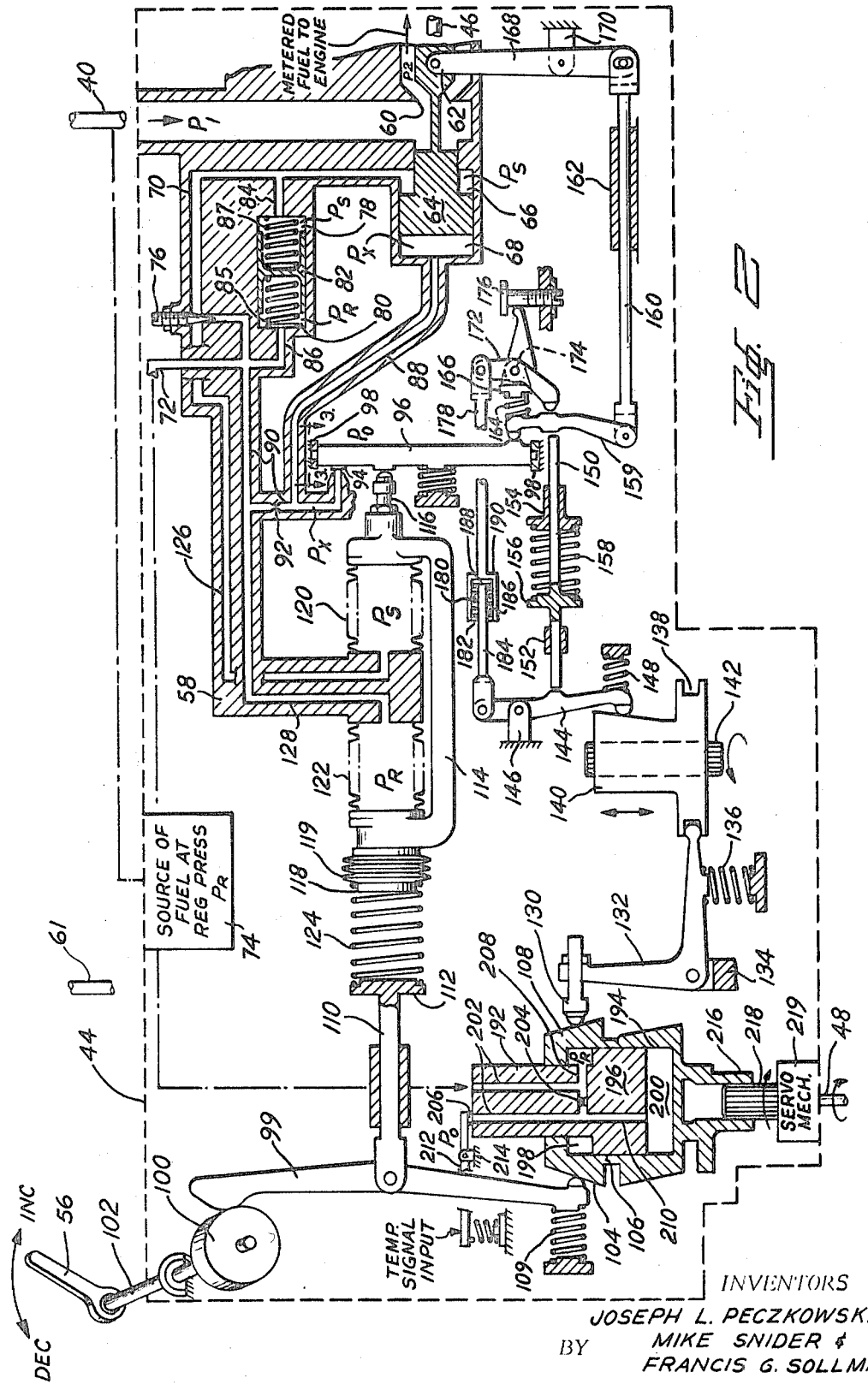

3,576,105

ENGINE GOVERNOR HAVING LAGGED RATE FEEDBACK

BACKGROUND OF THE INVENTION

Various prior art governor mechanisms having rate feedback compensation have been proposed for providing isochronous engine governing action as, for example, the governors shown and described in U.S. Pat. No. 2,478,753 issued Aug. 9, 1949, to G. E. Parker and U.S. Pat. No. 3,142,154 issued July 28, 1964, to P. J. Leeson. However, such prior art governor mechanism involves a somewhat complex array of fluid flow and/or pressure controlling valves and the like which tend to result in a bulky and relatively heavy control unit. Furthermore, such mechanisms are not easily adjusted for calibration purposes and are unable to or not easily modified to accommodate additional control functions which may be desired.

It is an object of the present invention to provide control apparatus adapted to provide a control output signal as a function of a variable input signal and provided with a simple and reliable control network operative to generate a lagged feedback signal which is a function of the rate of change of the output signal.

It is another object of the present invention to provide a variable speed engine governor mechanism of the hydromechanical type for accurately and reliably controlling fuel flow to the engine as a function of an engine speed error input signal wherein the speed error signal is modified by a lagged feedback signal which varies as a function of the rate of change of fuel flow to the engine.

BRIEF DESCRIPTION OF THE DRAWINGS

FIG. 2 represents a schematic view of the present invention shown in enlarged form and detached from the control system of FIG. 1;

DESCRIPTION OF THE PREFERRED EMBODIMENT

Figure 1:
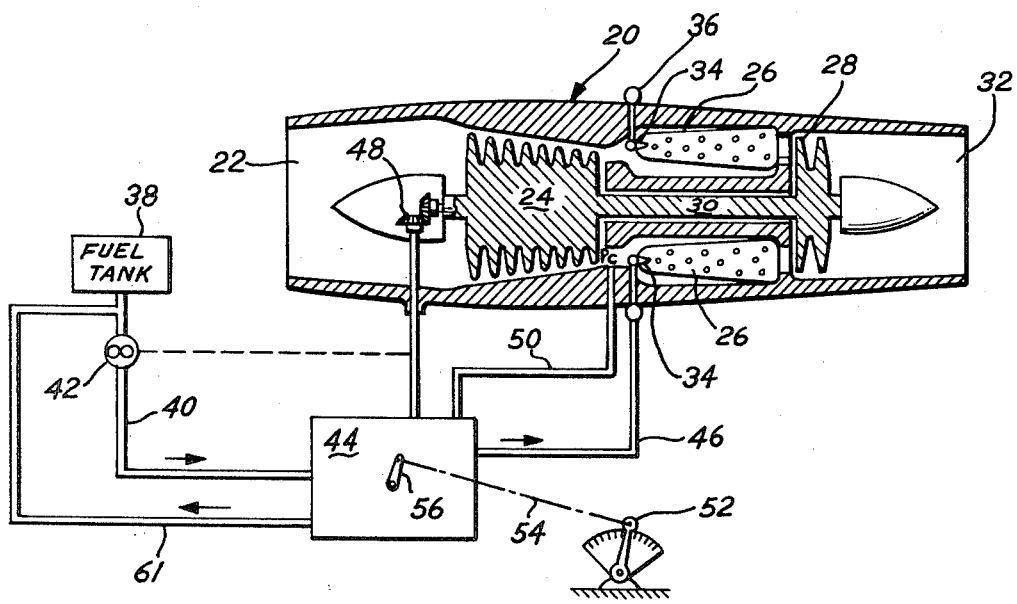
FIG. 1 represents a schematic view of a gas turbine engine and associated central system embodying the present invention.
Figure 3:
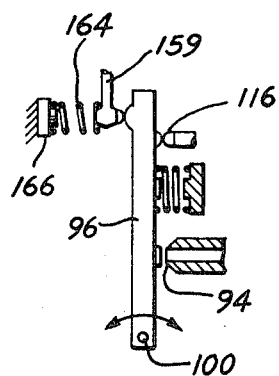
FIG. 3 is a sectional view taken on line 3–3 of FIG. 2.

Referring to the drawings and FIG. 1, in particular, numeral 20 designates a conventional combustion engine shown in the form of a gas turbine type having an air inlet 22 and an air compressor 24 adapted to receive air from inlet 22 and discharge the same at higher pressure to a plurality of combustion chambers 26 which, in turn, generate hot motive gas to drive one or more gas turbines 28 connected to drive the compressor 24 via a shaft 30 suitably mounted for rotation. The remaining energy of the gas exhausted from turbine 28 may be absorbed by an external load in the case of a free or independently rotatable gas turbine, not shown, downstream from turbine 28 or may be discharged to the atmosphere through an exhaust nozzle 32 to provide jet thrust.

The combustion chambers 26 are supplied a controlled flow of pressurized fuel via fuel injection nozzles 34 connected to receive fuel from an annular manifold 36. Manifold 36 is supplied fuel from a tank 38 via a conduit 40 containing an engine-driven fuel pump 42 and a fuel meter 44 connected to receive unmetered pressurized fuel from conduit 40 and discharge metered pressurized fuel to a conduit 46 which, in turn, discharges to manifold 36. The fuel meter 44 is adapted to receive various control input signals including rotational speed of compressor 24 connected thereto via conventional gear and shafting arrangement generally indicated by 48, compressor 24 discharge air pressure $P$ transmitted thereto via passage 50 and the position of engine speed request lever 52 suitably connected thereto via link 54 and lever 56.

Referring to FIG. 2, the governor apparatus embodying the present invention is shown removed from the fuel meter 44 to eliminate that portion of fuel meter 44 not necessary for a full disclosure of applicant's invention. Numeral 58 designates a casing having a fuel metering orifice 60 connected to receive unmetered fuel at pump discharge pressure $P_1$ from conduit 40 and discharge metered fuel at pressure $P_2$ to conduit 46. The rate of fuel flow to conduit 46 and thus fuel supplied to combustion chambers 26 varies as a function of the effective flow area defined by orifice 60 and the fuel pressure differential $P_1 - P_2$ thereacross. Depending upon control characteristics desired, the fuel pressure differential $P_1 - P_2$ may be maintained at a constant value by conventional fuel bypass valve means, not shown, in which case metered fuel flow varies depending upon the effective flow area of orifice 60. As an alternative, the bypass valve means, not shown, may be of the type responsive to a suitable variable condition of engine operation and operative to control the fuel pressure differential $P_1 - P_2$ as a function of the variable condition of engine operation in which case metered fuel flow varies depending upon the effective flow area of orifice 60 as well as the variable fuel pressure differential $P_1 - P_2$ established thereacross. Preferably, the fuel meter 44 is of the type utilizing a constant fuel pressure differential $P_1 - P_2$ across orifice 60 regardless of the effective flow area thereof. A passage 61 connecting the interior of fuel meter 44 with conduit 40 at relatively low fuel pump inlet pressure $P_o$ provides a fuel drain.

The effective flow area of orifice 60 is established by a metering valve 62 slidably carried by casing 58 and provided with a differential area piston portion 64 which partially defines variable volume fluid chambers 66 and 68 between which a control fluid pressure differential $P_s - P_x$ is generated. The relatively smaller area of piston portion 64 is exposed to chamber 66 which is vented via passages 70 and 72 to a source of fuel 74 at regulated substantially constant pressure $P_R$. The source 74 may receive fuel at fuel pump outlet pressure $P_1$ and include conventional fuel pressure regulating valve means, not shown, adapted to reduce the pressure $P_1$ to the desired constant value $P_R$. An adjustable fluid restriction or valve 76 threadedly engaged with casing 58 is provided in passage 70.

Variable volume chambers 78 and 80 partially defined by a movable wall 82 slidably carried by casing 58 are vented via passages 84 and 86, respectively, to passage 70 on opposite sides of valve 76. In the absence of a differential between pressures $P_s$ and $P_R$ in chambers 78 and 80, respectively, the movable wall 82 is balanced by equal and opposite forces derived from compression springs 85 and 87 bearing thereagainst.

The chamber 68 is vented via a passage 88 to a passage 90 leading from passage 72 at pressure $P_x$ to the interior of casing 58 at relatively lower drain fuel pressure $P_0$. A fixed area fluid restriction 92 is disposed in passage 90 upstream from passage 88 and a flapper servovalve 94 coacts with the discharge end of passage 90 to vary the intermediate fuel pressure $P_x$. The servovalve 94 is carried by a lever 96 pivotally mounted on fixed supports 98.

The lever 96 is actuated in response to the position of a cam follower 99 having one end bearing against a rotatable cam 100 which is connected via a shaft 102 to lever 56 thereby assuming a position in accordance with the position of engine speed request lever 52. The opposite end of follower 99 bears against a first three-dimensional governor cam surface 104 of an axially and rotatably movable cam 106 having a second three-dimensional acceleration cam surface 108. A compression spring 109 interposed between casing 58 and follower 99 imposes a preload on the latter. The cam 108 is rotated in response to actual rotational speed of compressor 24 and moved axially as a function of a condition of engine operation as will be described hereinafter. A rod 110 pivotally secured at one end to follower 99 intermediate the ends thereof is slidably carried by casing 58 and provided with a spring retaining portion 112 at its opposite end. A generally U-shaped bracket 114 is provided with an adjustable stem 116 threadedly engaged with one leg thereof and a circular spring retaining portion 118 suitably secured to the other leg of bracket 114 via a plurality of temperature responsive discs 119. The bracket 114 is resiliently mounted on casing 58 via bellows 120 and 122 each of which is secured at one end to casing 58 by any suitable means providing a fluid seal. The opposite ends of bellows 120 and 122 are fixedly secured to an associated one leg of bracket 114 by any suitable means providing a fluid seal. A compression spring 124 interposed between retaining portions 112 and 118 imposes a force load against bracket 114 which force load varies depending upon the axial position of rod 110 in response to the requested and/or actual speed inputs applied to follower 99.

The interior of bellows 120 is vented via a passage 126 to passage 70 at the same pressure $P$ as chamber 66. The interior of bellows 122 is vented via a passage 128 to passage 72 at pressure $P_R$. As will be described hereinafter, the bracket 114 is adapted to respond to a differential between pressures $P_s$ and $P_R$ resulting in a force load opposing or aiding compression spring 124 depending upon the relative error between pressures $P_s$ and $P_R$.

Engine acceleration and deceleration metered flow is influenced by the action of a control circuit which includes a cam follower 130 responsive to acceleration cam surface 108 and secured to one arm of a bellcrank 132 which, in turn, is mounted for pivotal movement on a fixed support 134. A compression spring 136 interposed between casing 58 and crank 132 preloads follower 130 into engagement with cam surface 108. The second arm of crank 132 extends into sliding engagement with an annular slot 138 in a three-dimensional cam 140 which is carried on a splined shaft 142 and which is actuated axially in response to movement of crank 132. The splined shaft 142 and thus cam 140 is rotated as a function of a condition of engine operation by suitable conventional motor means, not shown, responsive to discharge air pressure $P_c$, for example, of compressor 24.

A cam follower 144 pivotally mounted on a fixed support 146 bears against cam 140 in response to the preload of a compression spring 148 interposed between follower 144 and casing 58. A rod 150 slidably carried in fixed supports 152 and 154 is provided with a spring retainer 156. A compression spring 158 interposed between spring retainer 156 and fixed support 154 preloads rod 150 into engagement with follower 144. The opposite end of rod 150 is adapted to be engaged by a lever 159 pivotally mounted at one end to a feedback rod 160 slidably carried in a fixed support 162. The opposite end of lever 159 bears against lever 96 and is preloaded thereagainst by a compression spring 164 interposed between lever 159 and a fixed retainer 166. The feedback rod 160 is pivotally connected at its opposite end to one end of a lever 168 which, in turn, has its opposite end pivotally secured to metering valve 62 and which is pivotally mounted on a fixed support 170.

A multiarm lever 172 pivotally secured to a fixed support 174 has one arm adapted to engage lever 159 and a second arm adapted to engage an adjustable stop 176 threadedly engaged with casing 58. A third arm of lever 172 is pivotally secured to one end of a rod 178 the opposite end of which rod defines a chamber 180 having an opening in an end wall 182 thereof through which a rod 184 slidably extends. A compression spring 186 interposed between end wall 182 and a spring retainer 188 integral with rod 184 preloads rod 184 axially into engagement with the opposite end wall 190 of chamber 180. The free end of rod 184 is pivotally secured to cam follower 144.

The cam 106 is mounted on a fixed support 192 which extends into a circular chamber 194 within cam 106 and which is provided with an enlarged diameter differential area portion 196 separating chamber 194 into variable volume chambers 198 and 200. A passage 202 in support 192 receives fuel at regulated pressure $P_R$ from source 74 and discharges to the interior of casing 58 at relatively lower drain pressure $P_0$. A fixed area restriction 204 and a variable area flapper valve 206 downstream therefrom are disposed in passage 202 to generate a control fuel pressure differential $P_R-P_y$ which varies depending upon the position of the flapper valve 206. A passage 208 connects passage 202 upstream from restriction 204 to variable volume chamber 198 and a passage 210 connects passage 202 downstream from restriction 204 to variable volume chamber 200. The flapper valve 206 may be connected to a lever 212 pivotally mounted on a fixed support 214 and actuated by an input signal generated by conventional sensing apparatus, not shown, responsive to a variable engine operating condition which, for example, may be an engine temperature. The cam 106 is provided with a tubular extension 216 adapted to receive a splined shaft 218 which is rotatably positioned by conventional servomechanism generally indicated by 219 suitably connected to shaft 48 driven by compressor 24 and adapted to position cam 106 as a linear or nonlinear function of speed of compressor 24. It will be recognized that the cam 106 is positioned axially in response to the control pressure differential $P_R-P_Y$ generated between variable volume chamber 198 and 200 as a function of said variable condition of engine operation and rotationally in response to movement of shaft 218 as a function of the speed of compressor 24.

For the purpose of describing the operation of the above-mentioned governor apparatus, it will be assumed initially that the engine is operating at a stable speed corresponding to the position of lever 56 in which case the various elements occupy the positions shown in FIG. 2. An engine acceleration is initiated by moving speed request lever 56 to a higher than existing speed setting causing cam 100 to rotate accordingly, thereby exposing a reduced radial contour to follower 99 which pivots on cam surface 104 and displaces rod 110 to the left as viewed in FIG. 2. Likewise, the bracket 114 moves to the left under the influence of the reduced force output of spring 124 thereby tilting lever 96 in a direction tending to close flapper valve 94. The extent of tilting motion of lever 96 is restricted as a result of lever 96 engaging rod 150 which is positioned by cam 140 and establishes the position of flapper valve 94. The resulting increase in pressure $P_x$ in chamber 68 drives piston 64 toward the right thereby opening metering valve 62 to initiate an increase in metered fuel flow to combustion chambers 26 and accelerate the engine accordingly. The cam 106 rotates in response to increasing speed of compressor 24 and moves axially in response to the position of flapper valve 206 as a function of engine temperature thereby displacing follower 130 accordingly which, in turn, drives cam 140 axially. Since cam 140 rotates in response to compressor discharge pressure $P_c$, it will be recognized that the position of follower 144 is a function of rotational speed of compressor 24 as well as the sensed engine temperature and compressor discharge pressure, $P_c$. The rod 150, under the influence of spring 158 moves axially to follow follower 144 thereby resetting lever 159 pivotally in a counterclockwise direction as viewed in FIG. 2 and thus lever 96 abutting follower 144 which, in turn, tends to close flapper valve 94 causing an increase in pressure $P_x$ to chamber 68 and movement of metering valve 62 in a direction to increase metered fuel flow thereby effectively establishing a predetermined acceleration fuel flow schedule in accordance with the limits established by the variable conditions of engine operation impressed on cam 140.

The feedback rod 160 is actuated by metering valve 62 causing lever 159 to pivot on rod 150 in a clockwise direction which, in turn, tends to null the effect of rod 150 for a given position thereof.

It will be noted that fuel at pressure $P_s$ is forced out of chamber 66 as piston 64 moves to open metering valve 62 and is restricted by restriction 76 thereby generating a rise in pressure $P_s$ and thus a pressure differential $P_s-P_R$ across movable wall 82 which moves from its neutral position against the resistance of spring 85 to cause an increase in volume of the chamber 78 thereby absorbing flow from chamber 66 which, in turn, imposes a lag effect on the pressure differential generated across restriction 76. The desired pressure $P_s$ lag effect may be established as desired by selecting springs 85 and 87 of suitable spring rate as well as suitable sizing of the effective area of movable wall 82 and/or volume of chamber 78 partially defined by wall 82.

The bellows 120 responds to the lagged pressure $P_s$ rise which overcomes the opposing pressure $P_R$ in bellows 122 thereby unbalancing bracket 114 and stem 116 carried thereby towards lever 96. As the compressor 24 approaches the requested speed, the cam 106 and thus contoured surface 104 rotates to a position whereby lever 99 pivots in a counterclockwise direction about its point of contact with cam 100 to initiate a decrease in metered fuel flow and thus governor break action. To that end, spring 124 is compressed as follower 99 moves thereby increasing the force applied by spring 124 to bracket 114 in the direction of the existing force derived from the difference in pressures $P_s$ and $P_R$ imposed on bellows 120 and 122, respectively. In effect, the net force derived from bellows 120 and 122 acts as an engine speed rate signal since the pressure $P_s$ varies depending upon the direction of movement of and the rate at which the piston 64 moves in response to the controlling pressure $P_x$ applied to the latter. For control stability purposes, a time delay or lag is imposed on the pressure $P_s$ variations by movable wall 82 in the heretofore-mentioned manner. The force output of bracket 114 is transmitted via stem 116 against lever 96 and overcomes spring 164 thereby permitting lever 96 to lift lever 159 off rod 150 and displace flapper valve 94 in an opening direction to thereby decrease pressure $P_x$ and reverse the motion of metering valve 62 causing a decrease in metered fuel flow to the engine. The movement of piston 64 in a direction tending to close metering valve 62 has the effect of increasing the volume of chamber 66 in response to which pressure $P_s$ tends to decrease by virtue of the restriction 76. However, the movable wall 82 which responds to the decrease in pressure $P_s$ moves under the influence of opposing pressure $P_R$ thereby forcing fuel into passage 70 and chamber 66 communicating therewith to sustain the pressure $P_s$ and delay the resulting pressure differential $P_R - P_s$ accordingly. The lagged or delayed force derived from bellows 120 and 122 acts in opposition to the spring 124 thereby decreasing the net output force applied to lever 96 which, in turn, results in closing movement of flapper valve 94 in accordance with the rate of change of position of metering valve 62 and thus rate of change of fuel flow. The delayed anticipation or lead effect derived from pressure $P_s$ eventually dissipates whereupon a force balance on lever 96 is realized at which time the piston 64 is stabilized resulting in control over metered fuel flow as necessary to maintain the speed of compressor 24 at the requested speed corresponding to the position of lever 56.

A deceleration of the engine to a lower than existing speed is initiated by suitable movement of lever 56 which results in pivotal movement of follower 99 in a clockwise direction about its point of contact with cam surface 104. The resulting compression of spring 124 imposes a corresponding increase in force applied by stem 116 against level 96 which moves against the resistance of spring 164 to open flapper valve 94 causing a drop in pressure $P_x$ and corresponding movement of piston 64 in a direction to close metering valve 62 and reduce fuel flow. A predetermined deceleration fuel flow schedule which is a percentage of the aforementioned acceleration fuel flow schedule for any given speed of compressor 24 is maintained by virtue of the lever 159 engaging the adjacent arm of multiarm lever 172 which serves as a positionable stop for lever 159 and thus lever 96. The lever 172 is positioned via follower 144 and rods 184 and 178 in proportion to movement of follower 144 produced by cam 140. The proportional relationship of movement of lever 172 relative to follower 144 depends upon the relative effective lengths of lever arms of follower 144 from the pivotal axis thereof to the rod 182 connected thereto and rod 150 engageable therewith as well as the effective lever arms established by multiarm lever 172 and may be varied as desired by suitable design. A minimum allowable fuel flow is established by adjustable stop 176 which is engaged by one of the arms of multiarm lever 172 to limit the counterclockwise movement of lever 172 in response to cam 140. With lever 172 engaged with stop 176 thereby fixing the position of rod 178 accordingly, any further rise in the contour of cam 140 causes the rod 184 to move to the left against the resistance of spring 186 thereby providing a one-way collapsible link between rods 178 and 184.

Temperature responsive discs 119 expand or contract in response to variations in temperature of the fuel surrounding discs 119 and spring 124 to thereby compensate for rate variations of spring 124 caused by temperature changes of the surrounding fuel.

We claim:

1. A combustion engine fuel meter responsive to actual engine speed and request engine speed input signals including governor means having a lagged rate feedback control circuit comprising:

a source of pressurized fuel;

a fuel conduit connected to supply pressurized fuel from said source to the engine;

valve means operatively connected to said fuel conduit for controlling fuel flow therethrough to the engine;

fluid pressure responsive means responsive to a regulated substantially constant pressure fluid and a controlled variable pressure fluid operatively connected to said valve means for actuating the same;

servovalve means operatively connected to control said variable pressure fluid to which said valve means responds;

lever means operatively connected to said servovalve means for actuating the same;

a restriction in flow controlling relationship with said substantially constant pressure fluid for generating a fluid pressure differential which varies as a function of the rate of change of position of said fluid pressure responsive means;

variable volume chamber means including a spring loaded movable wall responsive to said fluid pressure differential and adapted to delay said pressure differential across said restriction;

first force producing means responsive to actual and request engine speed input signals operatively connected to said lever means for imposing a force thereon which varies depending upon the relative error between said speed signals;

second force producing means responsive to said pressure differential generated across said restriction and operatively connected to said lever means in force opposing relationship to said first force producing means to thereby establish a resultant force on said lever means which varies as a lagged function of the rate of change of position of said fluid pressure responsive means.

2. A combustion engine fuel meter as claimed in claim 1 wherein:

said fluid pressure responsive means includes a differential area member having a first area exposed to said substantially constant fluid pressure and a second relatively larger area exposed to said variable pressure fluid controlled by said servovalve means;

said variable volume chamber means including first and second variable volume chambers separated by said movable wall and vented to opposite sides of said restriction;

first and second spring members operatively connected to said movable wall in force opposing relationship for urging said movable wall to a balanced position in the absence of a fluid pressure differential thereacross.

3. A combustion engine fuel control as claimed in claim 1, wherein:

said first force producing means includes a bracket having spaced apart end portions and provided with first and second resilient fluid pressure responsive members operatively connecting said spaced apart ends to a fixed support thereby adapting said bracket for movement relative to said support;

first passage means connecting said first resilient fluid pressure responsive means to said restriction on one side thereof;

second passage means connecting said second resilient fluid pressure responsive means to said restriction on the opposite side thereof;

a governor spring interposed between one end of said bracket and a movable spring retaining member;

a first movable cam for generating a position signal representing said request engine speed signal;

a second movable cam for generating a position signal representing said actual engine speed signal;

actuating means responsive to engine speed operatively connected to said second cam force for actuating the same; and follower means operatively connected to said first and second cams and said movable spring retaining member for varying the effective force load imposed by said governor spring on said bracket in response to said request and actual engine speeds.

4. A combustion engine fuel meter as claimed in claim 1 and further including:

cam means responsive to actual engine speed;

follower means positioned by said cam means;

a position feedback member operatively connected to said valve means and movable therewith;

second lever means pivotally secured to said position feedback member and engageable with said first named lever means;

resilient force producing means operatively connected to said second lever means for loading the same and thus said first named lever means in opposition to said first force producing means;

first stop means operatively connected to said follower means and actuated thereby into engagement with said second lever means to position the same against the resistance of said resilient force producing means thereby causing said first named lever means to move accordingly and establish a corresponding engine acceleration fuel flow which varies as a function of engine speed.

5. A combustion engine fuel meter as claimed in claim 4 and further including: second stop means operatively connected to said follower means and actuated thereby into engagement with second lever means to position the same and thus said first-named lever means engageable therewith against the resistance of said first force producing means to establish a corresponding deceleration engine fuel flow which is a predetermined percentage of the acceleration fuel flow for any given engine speed.

6. A combustion engine fuel meter as claimed in claim 5 and further including;

a fixed abutment engageable with said second stop means for limiting the movement thereof to establish a predetermined minimum fuel flow during an engine deceleration; and said operative connection between said second stop means and said follower means includes a one-way collapsible member adapted to collapse to permit movement of said follower means upon engagement of said second stop means with said fixed abutment.

7. A combustion engine fuel meter as claimed in claim 1 wherein:

said fuel meter includes a casing vented interiorly to a drain fuel source;

said force producing means is exposed to said fuel within said casing and includes a governor spring and temperature responsive means responsive to the temperature of the fuel within said casing;

said temperature responsive means being operatively connected to said governor spring and adapted to compensate for variations in temperature of said governor spring.

8. A combustion engine fuel meter as claimed in claim 3 wherein:

said first movable cam is a rotatable and axially movable cam;

said first movable cam being rotated as a function of engine speed and actuated axially in response to actuating mechanism responsive to a variable condition of engine operation.

9. A combustion engine fuel meter as claimed in claim 8 wherein:

said first movable cam is provided with first and second independent contoured surfaces one of which is engaged by said follower means; and said actuating means includes follower means engageable with said second contoured surface for actuating said second movable cam in response to axial and rotary motion of said first movable cam.

10. A combustion engine fuel meter as claimed in claim 9 wherein;

said second movable cam is a rotatable and axially movable cam adapted to be actuated axially by said actuating means; and means responsive to a second variable condition of engine operation operatively connected to said second movable cam for rotating the same.